Patented Feb. 5, 1952

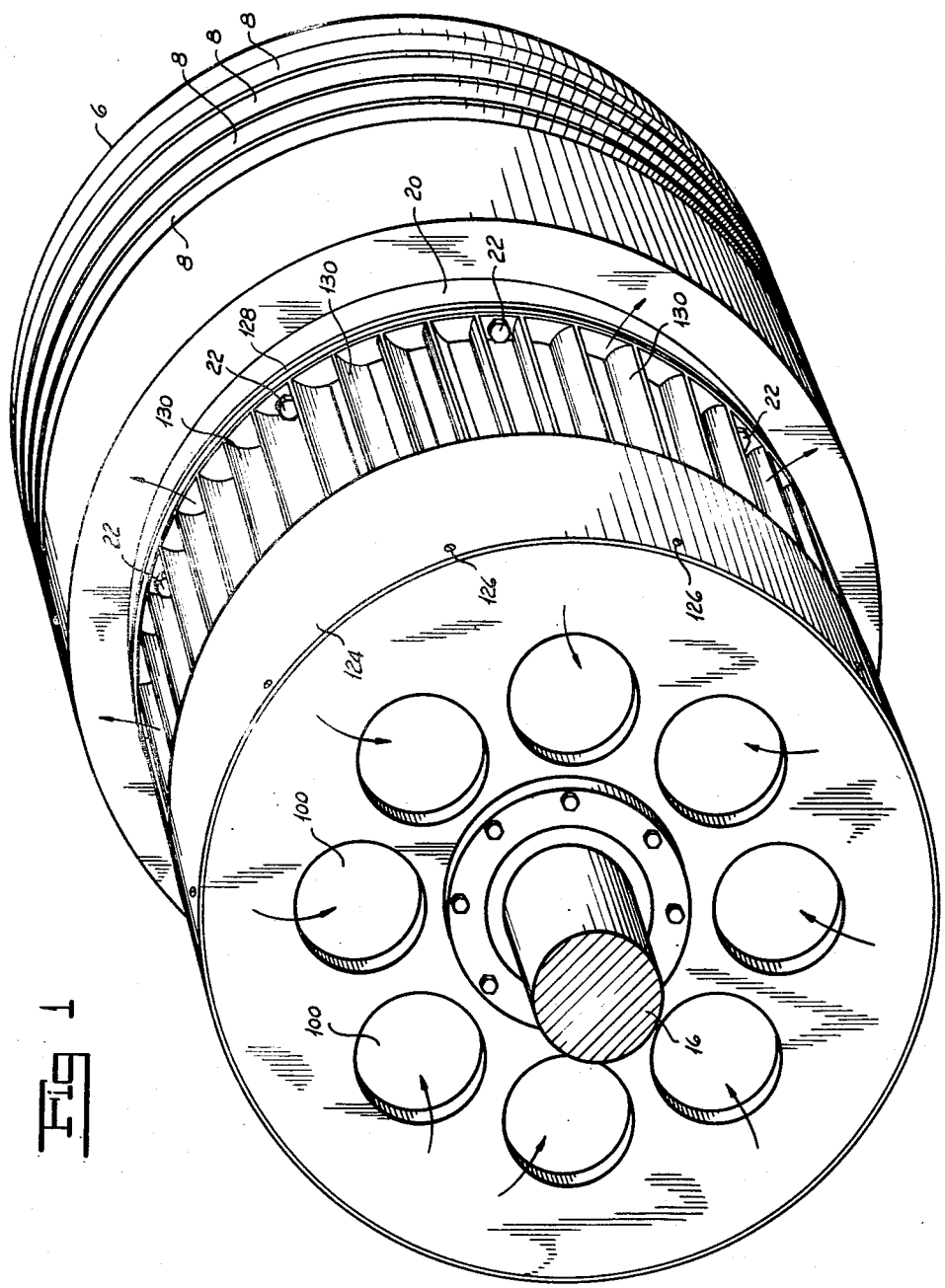

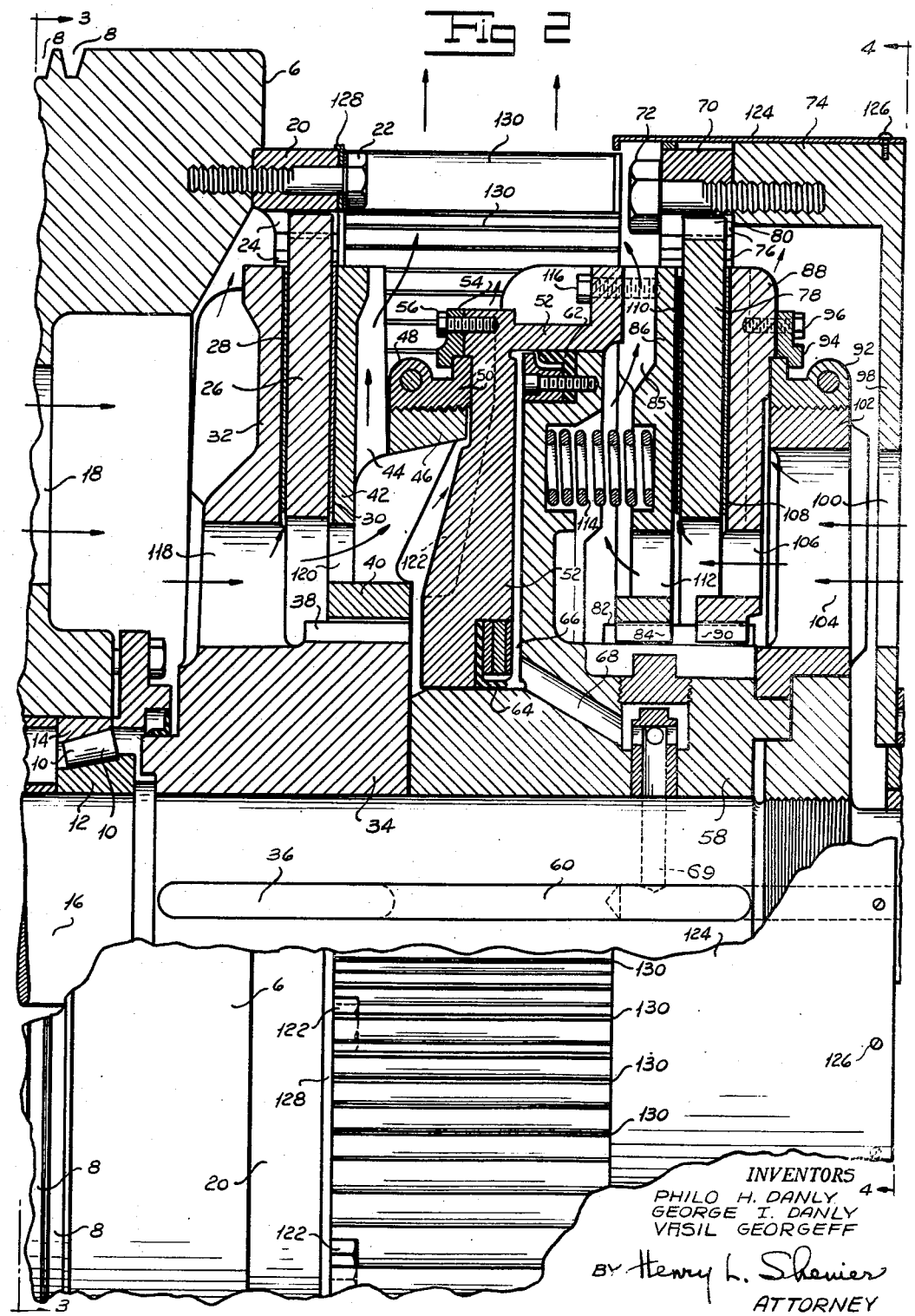

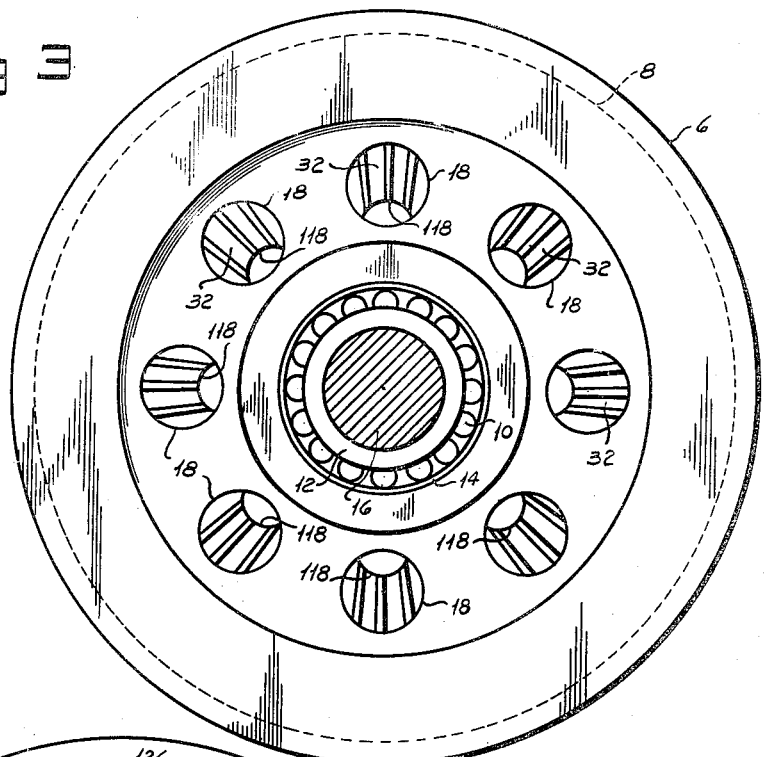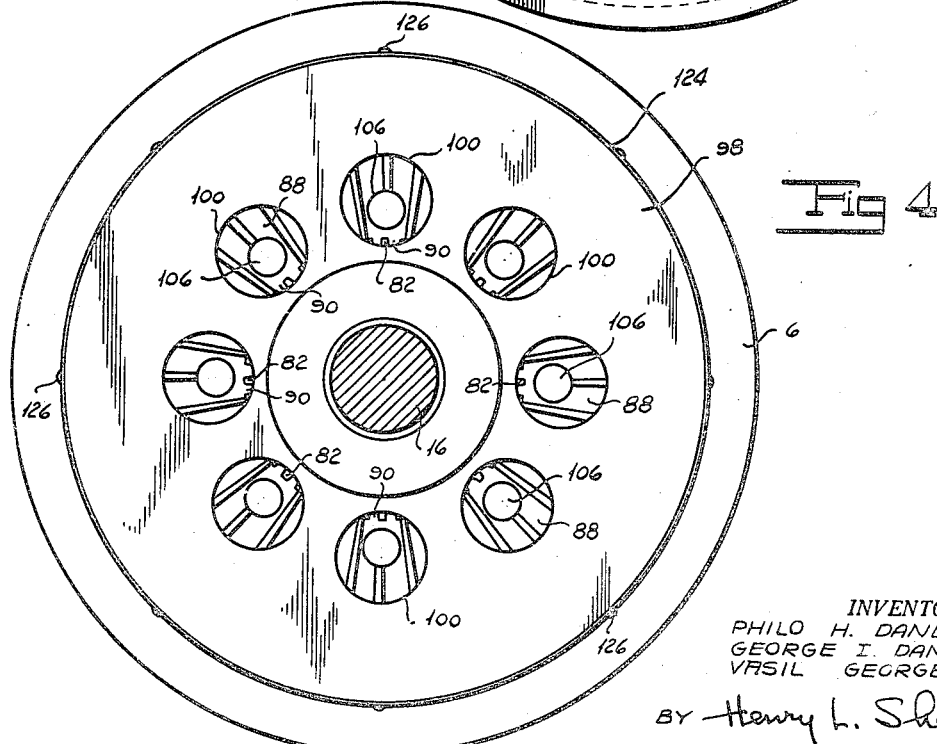

2,584,190

UNITED STATES PATENT OFFICE 2,584,190

AIR-COOLED PRESS BRAKE AND CLUTCH ASSEMBLY

Philo H. Danly, Hinsdale, George I. Danly, Elmhurst, and Vasil Georgeff, Chicago, Ill., assignors to Danly Machine Specialties, Inc., Chicago, Ill., a corporation of Illinois Application November 3, 1947, Serial No. 783,744

2 Claims. (Cl. 192—12)

Our invention relates to air cooled press clutch and brake assemblies and, more particularly, to an improved clutch and brake assembly for power presses in which the brake and clutch are continuously cooled by heat exchange with air constantly passed in contact with brake and clutch structures.

In a power press the energy required per stroke is substantially the product of the average load and the working distance plus a friction allowance. In short stroke operations such as blanking the working energy is largely supplied from the kinetic energy stored in the flywheel and the motor serves merely to return the flywheel to speed during the large part of the cycle in which no work is done. In drawing operations, the working period is longer and in many cases the motor takes an increased part of the working load.

It is common practice in power presses to employ a continuously running motor driving a flywheel which is adapted to be clutched to and unclutched from the gear train driving an eccentric or crank. The arrangement is such that the ram and associated drive when unclutched from the flywheel are brought to rest and immobilized by a brake. At the start of the working stroke the brake is substantially simultaneously released and the clutch engaged. Since large amounts of energy must be handled the friction involved, especially in large presses, is high. This friction stops the press when the clutch is disengaged and the brake set. Friction engages the flywheel with the working train of the press when the clutch is again engaged. The result is that large amounts of heat are developed from the friction, both in the clutching operation and the braking operation. The heat which may frequently be considerable has a deleterious effect on the clutch and brake lining material which results in a rapid deterioration of the brake and clutch linings. Then, too, a heat resistant type of brake and clutch lining material must be used which results in a noisy operation. The use of a harder lining material requires increased clutch and brake surfaces as the coefficient of friction between the lining material and the coacting friction plates is less than in the case of a softer and more deformable lining material. This latter material gives a greater friction, smoother action and more quiet operation than the harder brake lining material. The softer material, however, is so susceptible to heat that it cannot ordinarily be successfully employed.

Then, too, the heat generated can be injurious to other parts of the clutch and brake. The metal plates which bear against the lining can become warped or pitted by the heat. The springs can lose some of their temper and worst of all, the piston packing in the air cylinder, whether it be leather, rubber or synthetic material, can become hardened or otherwise deteriorated by heat and become leaky to the point of rendering the clutch and brake inoperative.

As a consequence of the deterioration of brake linings as a result of heat much time is lost in pressing operations in replacing brake linings and other parts. This is especially burdensome if the press is part of a production line since the entire line is blocked by a press, the clutch and brake linings and other parts of which must be renewed.

One object of our invention is to provide an improved press clutch and brake assembly in which the clutch and brake parts are continuously cooled by circulated air so that the heat generated by the clutching and braking operations will be constantly dissipated by heat exchange whereby the clutch and brake parts will operate at a lower temperature and by means of which high temperatures having a deleterious effect on the brake linings, clutch linings and other parts may be avoided.

Another object of our invention is to provide an improved air cooling system for a press clutch and brake assembly which is simple and easy to install and efficient in operation, and inexpensive to construct.

A further object of our invention is to provide an air cooling system in combination with press clutch and brake assembly which may be used with a large number of differently constructed brake and clutch structures without influencing their mechanical operation.

Other and further objects of our invention will appear from the following description:

In the accompanying drawings which form part of the instant specification, and which are to be read in conjunction therewith, and in which like reference numerals are used to show like parts in various views:

Fig. 1 is a perspective view of a clutch and brake assembly showing one embodiment of our invention.

Fig. 2 is an enlarged elevation with parts in section and parts broken away of the embodiment of our invention shown in Fig. 1.

Fig. 3 is an end view drawn on a smaller scale viewed from the left of line 3—3 in Fig. 2.

Fig. 4 is an end view drawn on a smaller scale taken along the line 4—4 of Fig. 2.

Referring now to the drawings, a flywheel 6 is provided with a plurality of grooves 8 in which a plurality of V belts are adapted to ride. The V belts pass across the output pulley of a prime mover (not shown) which may be an electric motor or the like. The flywheel 6 is adapted to rotate on roller bearings 10, the inner-race 12 of which is carried by a shaft 16, which is the highest speed shaft of the press. Flywheel 6 is supported directly from the outer-race 14 of the bearing. The web of flywheel 6 is provided with a plurality of openings 18 adapted to permit free passage of circumambient air. An annular ring 20 is secured to the flywheel 6 by a plurality of bolts 22. The internal periphery of the ring 20 is provided with a plurality of teeth 24 adapted to engage coacting teeth formed in the external periphery of a clutch plate 26. The clutch plate is provided with clutch linings 28 and 30. A limiting disc 32 is formed with a hub 34 which is keyed to shaft 16 by means of key 36. The hub 34 is formed with splines 38 adapted to coact with teeth formed in the internal periphery of the hub 40 which carries a clutch disc 42. One side of disc 42 is provided with a plurality of heat exchange fins 44 and is formed with a cylindrical boss 46. Threadedly engaged with the exterior of boss 46 we provide a ring 48 formed with a flange 50. A movable piston 52 is secured to the flange 50 by means of lugs 54 and bolts 56. A member 58 is secured to the shaft 16 for rotation therewith by means of key 60. An upper packing ring 62 and a lower packing ring 64 seal an annular air chamber 66 formed between member 58 and piston 52. A port 68 is adapted to provide communication between a source of fluid under pressure such as air and the interior of chamber 66 through a duct 69 formed in the shaft 16.

An annular ring 70 is secured by means of a plurality of bolts 72 to a portion 74 of the frame. The internal periphery of the ring 70 is provided with a plurality of teeth 76. A brake plate 78 is provided with a plurality of teeth 80 adapted to coact with teeth 76. The member 58 is provided with a plurality of splines 82 in which are seated coacting teeth 84 formed on the inner periphery of a brake disc 86. A backing brake disc 88 has its inner periphery formed with teeth 90 adapted to coact with the splines 82. The plate 88 is supported from a ring 92 to which it is secured by lugs 94 and bolts 96. The assembly housing 98 is provided with a plurality of openings 100. The member 102 supporting the ring 92 is provided with a plurality of openings 104. The backing brake plate 88 is provided with a plurality of openings 106. The brake plate 78 is faced with brake linings 108 and 110. The plate 86 is formed with a plurality of openings 112. A plurality of springs 114 are positioned between member 58 and plate 86. The springs thrusting against member 58 which is secured to the shaft 16, urge the plate 86 to the right as viewed in Fig. 2, thus tending to clamp the brake plate 78 between discs 88 and 86. Disc 86 is secured to piston 52 by a plurality of bolts 116 so that the springs carry the piston to the right as viewed in Fig. 2. This movement of the piston moves the clutch member 42 away from the clutch plate 26 so that the springs normally tend to release the clutch and set the brake.

The disc 32 is provided with a plurality of openings 118 communicating with the openings 18 of the flywheel. The clutch member 42 is provided with a plurality of apertures 120 adapted to permit the passage of cooling air. The face of the piston is provided with a plurality of passages 122 to permit the passage of cooling air as will be pointed out more fully hereinafter. The brake assembly is surrounded by a sheet metal shrouding 124 secured to frame work 74 by means of machine screws 126.

Clamped between the heads of bolts 22 and the annular ring 20, we provide a ring 128 to which is secured a plurality of centrifugal fan blades 130 forming a fan. It will be observed that the blades are positioned along the circumference of a circle having a large radius, thus giving the blades a high linear velocity of travel. The shroud 124 overhangs the blade tips and minimizes the short circuiting of cooling air.

We have described a specific clutch and brake structure for purposes of illustration only and it is to be understood that our invention may be used with any suitable brake or clutch or both.

In operation, let us assume that the brake is set, that is, the air cylinder 66 is at atmospheric pressure. The springs 114 move the disc 86 to the right as viewed in Fig. 2 clamping the brake plate 78 between disc 86 and backing plate 88, thus immoblizing member 58 and shaft 16 to which it is keyed. The movement of disc 86 to the right moves piston 52 to the right, thus moving ring 50 and clutch member 42 to the right freeing clutch plate 26. The clutch plate 26, however, is secured to the fly wheel and is rotating rapidly. The rotation of the fly wheel carries the blades 130 with it at a high linear velocity throwing air in the buckets formed by adjacent blades outwardly all around the periphery of the fan. The air thrown out by the blades creates an area of reduced pressure into which air will flow through openings 18, openings 118 between or along the clutch linings, through openings 120, past cooling fins 44 through passages 122, thus cooling the clutch parts. The air flow is shown by the arrows. At the same time air will be drawn through openings 100 and pass through openings 104, 106, 112 and outwardly in contact with the brake parts and the cooling fins 85 formed on the disc 86.

Let us now assume that air under pressure is supplied through port 68 into the cylinder 66. The piston 52 will move to the left as viewed in Fig. 2, carrying with it disc 86 against the action of springs 114, thus releasing the brake. At the same time the ring 50 and clutch member 42 will be carried to the left thus clamping the clutch plate 26 between clutch backing disc 32 and the clutch member 42. The clutch member 42 is splined by splines 38 to the hub 34 which is, in turn, keyed to the shaft 16. When the clutch is set the shaft will rotate carrying with it released backing plate 88 and disc 86, the brake plate 78 remaining stationary. The fan blades continue to throw out air and the entire assembly is continuously cooled whether the clutch is engaged or not.

It will be seen that we have accomplished the objects of our invention. We have provided a clutch and brake assembly which is continuously air cooled. We have found that in tests under artificially rigorous conditions, beyond those met in actual use, we have been enabled to maintain a reduced temperature of both brake and clutch components below a temperature at which the brake linings are seriously affected. By means of our assembly we can increase the life of the brake and clutch linings. Furthermore, we are enabled to use more deformable brake and clutch lining material making for a smoother operation of the assembly. Our cooling structure is simple and inexpensive. It is easy to install and is adaptable to brakes or clutches of various designs or both, without influencing their mechanical operation.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A clutch and brake assembly for presses, including in combination, a flywheel adapted to be continuously rotated by a prime mover, a shaft adapted to be driven from said flywheel, a clutch plate carried by said flywheel for rotation therewith, a coacting clutch member, means for mounting said clutch member for rotation with said shaft and for movement longitudinally thereof, a stationary frame, a brake plate carried by said frame, a coacting brake member, means for mounting said brake member for rotation with said shaft and for movement longitudinally thereof, means for connecting said brake member and said clutch member, spring means for biasing said brake member into engagement with said brake plate and simultaneously moving said clutch member out of engagement with said clutch plate, fluid pressure means for moving said brake member out of engagement with said brake plate and simultaneously moving said clutch member into engagement with said clutch plate against the action of said spring means, air inlet apertures formed in said flywheel, said clutch plate, said clutch member, and said frame, the apertures in said brake plate, said clutch plate, clutch member and said brake member being positioned adjacent said shaft, said brake and clutch parts being formed with radially extending passages adapted to permit the passage of cooling air, said clutch plate being spaced from said brake plate longitudinally of said shaft, a plurality of centrifugal fan blades carried by said flywheel and positioned between the planes of said brake and clutch plates, said blades forming a fan adapted to draw air through said passages to cool the clutch and brake structures.

2. An assembly as in claim 1 including, in combination, an imperforate shroud surrounding said brake plate and brake member and extending adjacent the tips of said fan blades whereby to prevent the short circuiting of air.

PHILO H. DANLY.
GEORGE I. DANLY.
VASIL GEORGEFF.

REFERENCES CITED

The following references are of record in the file of this patent:

UNITED STATES PATENTS

| Number | Name | Date |
|---|---|---|
| 1,831,083 | Stock | Nov. 10, 1931 |
| 2,009,301 | Rode et al. | July 23, 1935 |
| 2,095,094 | Glasner | Oct. 5, 1937 |
| 2,108,059 | Glasner | Feb. 15, 1938 |
| 2,221,014 | Williamson | Nov. 12, 1940 |
| 2,441,543 | Longfield | May 11, 1948 |